(12) United States Patent
Morishita

(10) Patent No.: US 12,051,271 B2
(45) Date of Patent: *Jul. 30, 2024

(54) SPOOFING DETECTION DEVICE, SPOOFING DETECTION METHOD, AND RECORDING MEDIUM

(71) Applicant: NEC Corporation, Tokyo (JP)

(72) Inventor: Yusuke Morishita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/200,774

(22) Filed: May 23, 2023

(65) Prior Publication Data

US 2023/0298383 A1 Sep. 21, 2023

Related U.S. Application Data

(63) Continuation of application No. 17/529,516, filed on Nov. 18, 2021, now Pat. No. 11,699,302, which is a (Continued)

(30) Foreign Application Priority Data

Oct. 15, 2014 (JP) ................................. 2014-210529

(51) Int. Cl.
*G06V 40/00* (2022.01)
*G06T 7/00* (2017.01)
(Continued)

(52) U.S. Cl.
CPC ............. *G06V 40/172* (2022.01); *G06T 7/00* (2013.01); *G06V 40/161* (2022.01); *G06V 40/40* (2022.01); *G06V 40/67* (2022.01)

(58) Field of Classification Search
CPC .......... G06K 9/00288; G06K 9/00912; G06K 9/00899; G06K 9/00228
(Continued)

(56) References Cited

U.S. PATENT DOCUMENTS

| 8,856,541 B1* | 10/2014 | Chaudhury | ............ G06V 40/67 |
| | | | 726/16 |
| 2007/0253604 A1* | 11/2007 | Inoue | ..................... G06V 40/40 |
| | | | 382/118 |

(Continued)

FOREIGN PATENT DOCUMENTS

| JP | 2000-083930 A | 3/2000 |
| JP | 2002-056394 A | 2/2002 |

(Continued)

OTHER PUBLICATIONS

Ali Asad, et al., "Spoofing attempt detection using gaze colocation", 2013 International Conference of the BIOSIG Special Interest Group (BIOSIG), Gesellschaft Fur Informatik E.V. (GI), Sep. 5, 2013, pp. 1-12, XP032495098 (Year: 2013).*

(Continued)

*Primary Examiner* — Van D Huynh

(57) ABSTRACT

To provide a technology of more accurately detecting spoofing in face authentication, without increasing a scale of a device configuration and a burden on a user. A spoofing detection device includes a facial image sequence acquisition unit, a line-of-sight change detection unit, a presentation information display unit, and a spoofing determination unit. The facial image sequence acquisition unit acquires a facial image sequence indicating the face of a user. The line-of-sight change detection unit detects information about a temporal change in the line-of-sight from the facial image sequence. The presentation information display unit displays presentation information presented to the user as part of an authentication process. The spoofing determination unit determines the likelihood of the face indicated by the facial image sequence being spoofing on the basis of the information about the temporal change in the line-of-sight with respect to the presentation information.

18 Claims, 12 Drawing Sheets

Related U.S. Application Data continuation of application No. 16/682,083, filed on Nov. 13, 2019, now Pat. No. 11,210,500, which is a continuation of application No. 15/514,573, filed as application No. PCT/JP2015/005147 on Oct. 9, 2015, now Pat. No. 10,515,262.

(51) Int. Cl.
*G06V 40/16* (2022.01)
*G06V 40/40* (2022.01)
*G06V 40/60* (2022.01)

(58) Field of Classification Search
USPC .......................................................... 382/118
See application file for complete search history.

(56) References Cited

U.S. PATENT DOCUMENTS

| | | | | |
|---|---|---|---|---|
| 2009/0207251 A1* | 8/2009 | Kobayashi | ............. | G06V 40/18 382/117 |
| 2011/0254942 A1* | 10/2011 | Suzuki | ................... | G06V 40/16 348/E7.087 |
| 2012/0246079 A1* | 9/2012 | Wilson | ............... | G06Q 20/3226 705/67 |
| 2012/0269405 A1* | 10/2012 | Kaneda | .................. | G06V 40/19 382/118 |
| 2013/0188840 A1* | 7/2013 | Ma | ......................... | G06V 40/45 382/107 |
| 2014/0016837 A1* | 1/2014 | Nechyba | ................ | G06V 40/45 382/118 |

FOREIGN PATENT DOCUMENTS

| | | | |
|---|---|---|---|
| JP | 2006-023953 | A | 1/2006 |
| JP | 2006-085226 | A | 3/2006 |
| JP | 2006-308375 | A | 11/2006 |
| JP | 2007-141002 | A | 6/2007 |
| JP | 2008-276345 | A | 11/2008 |
| JP | 2008-305400 | A | 12/2008 |
| JP | 4470663 | B2 | 6/2010 |
| JP | 4734980 | B2 | 7/2011 |
| JP | 4807167 | B2 | 11/2011 |
| JP | 5035467 | B2 | 9/2012 |

OTHER PUBLICATIONS

Manami Takada, "A study on continuous spoofing detection using attractive targets", Multimedia, Distributed, Cooperative, and Mobile Symposium (DICOMO 2009), Collection of Papers, Jul. 1, 2009, vol. 2009, No. 1, pp. 92 to 97, URL: http://minamigaki.cs.inf.shizuoka.ac.jp/work/2009/DICOMO200907takada.pdf.

International Search Report for PCT Application No. PCT/JP2015/005147, mailed on Dec. 1, 2015.

English translation of Written opinion for PCT Application No. PCT/JP2015/005147.

Communication dated May 4, 2018, from the European Patent Office in counterpart European Application No. 15850709.5.

Ali Asad, et al., "Spoofing attempt detection using gaze colocation", 2013 International Conference of the BIOSIG Special Interest Group (BIOSIG), Gesellschaft Für Informatik E.V. (GI), Sep. 5, 2013, pp. 1-12, XP032495098.

Japanese Office Action for JP Application No. 2020-149884 mailed on Oct. 19, 2021 with English Translation.

Extended European Search Report for EP Application No. 22161774.9, dated on Jul. 25, 2022.

Boehm et al., "SAFE: Secure authentication with Face and Eyes", 2013 International Conference on Privacy and Security in Mobile Systems (PRISMS), IEEE, Jun. 24, 2013, pp. 1-8.

* cited by examiner

Fig. 9

| t | 1 | 2 | 3 | ... | T |
|---|---|---|---|---|---|
| $g_x(t)$ | 1 | 2 | -5 | ... | -5 |
| $g_y(t)$ | -21 | -23 | -27 | ... | 209 |
| $G_x(t)$ | -3 | -3 | -1 | ... | -8 |
| $G_y(t)$ | -2 | -3 | -5 | ... | -3 |

SPOOFING DETECTION DEVICE, SPOOFING DETECTION METHOD, AND RECORDING MEDIUM

CROSS REFERENCE TO RELATED APPLICATIONS

The present application is a continuation application of U.S. patent application Ser. No. 17/529,516 filed on Nov. 18, 2021, which is a continuation application of U.S. patent application Ser. No. 16/682,083 filed on Nov. 13, 2019, which is issued as U.S. Pat. No. 11,210,500, which is a continuation application of U.S. patent application Ser. No. 15/514,573 filed on Mar. 27, 2017, which is issued as U.S. Pat. No. 10,515,262, which is a National Stage Entry of international application PCT/JP2015/005147 filed on Oct. 9, 2015, which claims the benefit of priority from Japanese Patent Application 2014-210529 filed on Oct. 15, 2014, the disclosures of all of which are incorporated in their entirety by reference herein.

TECHNICAL FIELD

The present invention relates to a technology of detecting an act of impersonation (spoofing) in face authentication.

BACKGROUND ART

A technology of detecting an act of spoofing in a security system (face authentication system) using face authentication is widely known. The act of spoofing is an act of pretending to be another person to fraudulently utilize a system. The act of spoofing is hereinafter also simply referred to as spoofing.

Spoofing against a face authentication system is performed by an impersonator presenting another person's face different from that of the impersonator to a camera for face imaging. The method of presenting another person's face includes a method of presenting a photograph of another person's face to a camera in the system. Further, the method includes a method of presenting a video image of another person's face displayed on a display of a smartphone or the like to a camera in the system. Examples of related arts relating to such spoofing are described in PTLs 1 to 8 below.

For example, a related art described in PTL 1 detects a line-of-sight of a user from an image captured from a camera, while presenting an image for drawing the user's attention on a display device. Then, the related art (liveness detection) determines that the user is a living body when the line-of-sight of the user points in a direction of the display device, otherwise determines that spoofing exists.

Further, a related art described in PTL 2 acquires a plurality of facial images of a user respectively captured from a plurality of different lines of sight. Then, the related art extracts feature points in the user's face from the respective plurality of facial images and determines whether or not the feature points are on a same plane. Then, the related art determines whether or not spoofing exists, in accordance with whether or not the feature points are on a same plane.

Further, a related art described in PTL 3 measures distances and angles to a plurality of measured points in a user's face by a distance sensor to specify positions of the plurality of measured points. Then, the related art determines whether or not spoofing exists, in accordance with whether or not the plurality of measured points are on a same plane.

Further, a related art described in PTL 4 guides a user to move a line-of-sight by randomly moving a mark displayed on a display device. Then, the related art determines whether or not spoofing exists, in accordance with whether or not the line-of-sight movement of the user agrees with a track of the mark.

Further, a related art described in PTL 5 causes a user to move his or her face in a direction instructed on a display screen and captures the movement with a camera. Then, the related art determines whether or not spoofing exists, in accordance with whether or not a movement of a feature point can be detected in time-series images capturing the user.

Further, a related art described in PTL 6 instructs a user on a way to move a predetermined part of his or her face (e.g. opening and closing of an eye) and captures the user's face. Then, the related art determines whether or not spoofing exists, in accordance with whether or not the predetermined part of the face in an obtained dynamic image changes in accordance with the instruction.

Further, a related art described in PTL 7 captures a line-of-sight movement of a user moving in a presented image as a dynamic line-of-sight pattern including time-series data of a moving speed and a moved position. Then, the related art registers the movement associated with a user identifier. Then, the related art checks the user's dynamic line-of-sight pattern being an authentication target against a registered dynamic line-of-sight pattern to evaluate a degree of matching. By use of the related art, whether or not spoofing exists can be determined in accordance with the degree of matching of the dynamic line-of-sight patterns.

Further, PTL 8 describes a line-of-sight detection technology that can be employed in the respective related arts described in PTLs 1, 4, and 7. The technology specifies a pupil included in a facial image and detects a line-of-sight from a position of the pupil and a direction of the face.

Thus, as a spoofing detection technology, a method of determination by whether or not a line-of-sight points in a direction of a display device is proposed. A method of determination by whether or not a subject of imaging is a three-dimensional object, and a method of determination by whether or not a line-of-sight and a movement of a face, as instructed or as registered, can be detected, are also proposed.

CITATION LIST

Patent Literature

[PTL1] Japanese Patent No. 4807167
[PTL2] Japanese Patent No. 5035467
[PTL3] Japanese Patent No. 4734980
[PTL4] Japanese Patent No. 4470663
[PTL5] Japanese Unexamined Patent Application Publication No. 2008-305400
[PTL6] Japanese Unexamined Patent Application Publication No. 2008-276345
[PTL7] Japanese Unexamined Patent Application Publication No. 2007-141002
[PTL8] Japanese Unexamined Patent Application Publication No. 2006-23953

SUMMARY OF INVENTION

Technical Problem

However, the related art described in PTL 1 is not able to sufficiently detect spoofing caused by presenting a video image. For example, it is assumed that an impersonator presents a video image of another person's face captured so as to point in various line-of-sight directions, being displayed on a display of a smartphone or the like, to a camera in a face authentication system. In this case, a likelihood that a line-of-sight direction in the video image at some time point to a display device is high. In this case, the related art mistakenly determines the face displayed on the display as a living body. Further, when positions of the display device and the camera in the face authentication system are previously known, it is possible to prepare a video image of a face, a line-of-sight of which points to the display device when the image points to the camera. Thus, the related art is not able to accurately detect spoofing caused by presenting a video image.

Further, the related art described in PTL 2 requires a plurality of cameras or a moving mechanism of a camera, in order to acquire a plurality of facial images respectively captured from a plurality of lines of sight. Further, the related art described in PTL 3 requires a distance sensor in order to specify positions of a plurality of measured points. Accordingly, there is a problem that a scale of a device configuration increases in the related arts.

Further, the related art described in PTL 4 guides a user to track, by a line-of-sight, a random movement of a mark displayed for spoofing determination. Further, the related art described in PTL 5 instructs a user to move his or her face in a designated direction for spoofing determination. Further, the related art described in PTL 6 instructs a user to move a predetermined part of his or her face for spoofing determination. Thus, a user is required to perform an extra action for spoofing determination in the related arts. Accordingly, the related arts increase a burden on a user.

Further, the related art described in PTL 7 requires preregistration of a dynamic line-of-sight pattern, and increases a burden on a user.

Further, PTL 8 does not describe applying the line-of-sight detection technology to spoofing determination.

The present invention is made to solve the aforementioned problems. That is to say, an object of the present invention is to provide a technology of more accurately detecting spoofing in face authentication, without increasing a scale of a device configuration and a burden on a user.

Solution to Problem

To achieve the above object, a spoofing detection device of the present invention includes: facial image sequence acquisition means that acquires a facial image sequence indicating a user's face; line-of-sight change detection means that detects information about temporal line-of-sight change from the facial image sequence; presentation information display means that displays presentation information presented to the user as part of authentication processing; and spoofing determination means that determines a likelihood that a face indicated by the facial image sequence is spoofing, in accordance with the information about temporal line-of-sight change with respect to the presentation information.

A spoofing detection method of the present invention includes: detecting, by a computer device, information about temporal line-of-sight change from a facial image sequence indicating a user's face; and determining, by a computer device, a likelihood that a face indicated by the facial image sequence is spoofing, in accordance with the information about temporal line-of-sight change with respect to presentation information presented to the user as part of authentication processing.

A recording medium, of the present invention, storing a spoofing detection program causing a computer device to perform: a facial image sequence acquisition step of acquiring a facial image sequence indicating a user's face; a line-of-sight change detection step of detecting information about temporal line-of-sight change from the facial image sequence; an information presentation step of displaying presentation information presented to the user as part of authentication processing; and a spoofing determination step of determining a likelihood that a face indicated by the facial image sequence is spoofing, in accordance with the information about temporal line-of-sight change with respect to the presentation information.

Advantageous Effects of Invention

The present invention is able to provide a technology of more accurately detecting spoofing in face authentication, without increasing a scale of a device configuration and a burden on a user.

BRIEF DESCRIPTION OF DRAWINGS

FIG. 9 is a diagram illustrating an example of detected information about temporal line-of-sight change, according to the second example embodiment of the present invention.

DESCRIPTION OF EMBODIMENTS

Example embodiments of the present invention will be described in detail below with reference to the drawings.

First Example Embodiment

Figure 1:
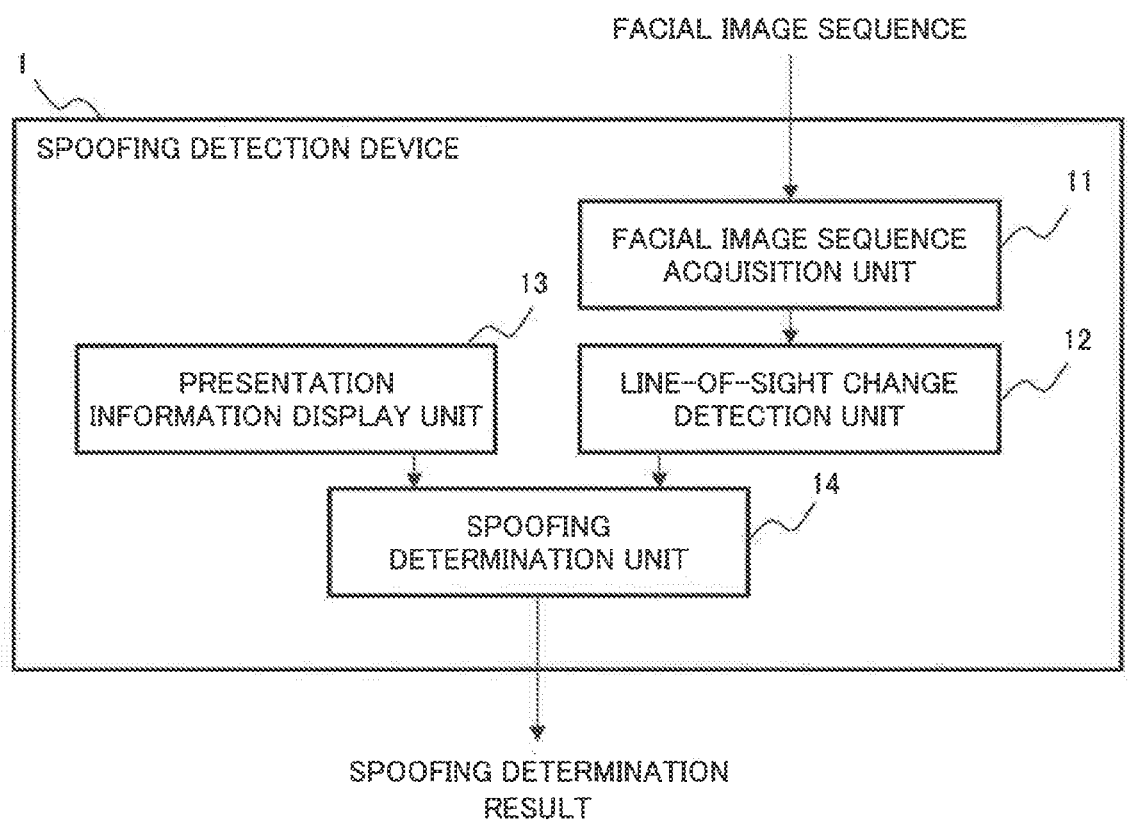
FIG. 1 is a functional block diagram of a spoofing detection device according to a first example embodiment of the present invention.

FIG. 1 illustrates a configuration of a spoofing detection device 1 according to a first example embodiment of the present invention. In FIG. 1, the spoofing detection device 1 includes a facial image sequence acquisition unit 11, a line-of-sight change detection unit 12, a presentation information display unit 13, and a spoofing determination unit 14. In FIG. 1, a direction of an arrow connecting rectangles representing functional blocks indicates an example, and does not limit a signal direction between functional blocks.

Figure 2:
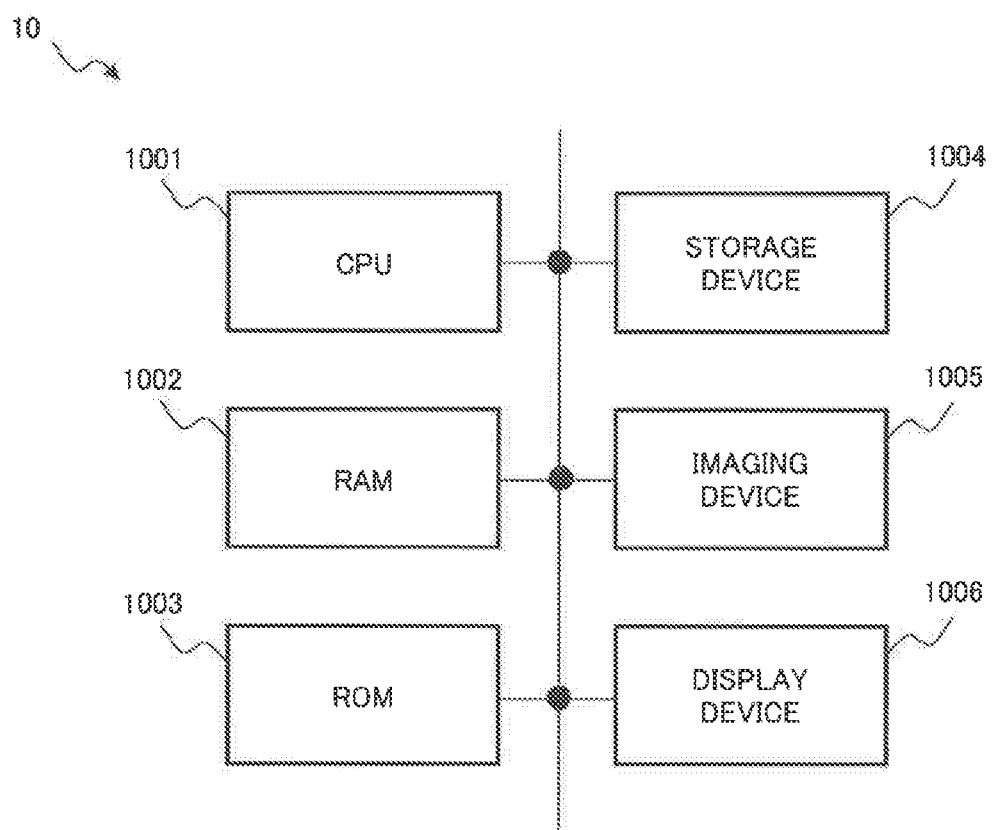
FIG. 2 is a diagram illustrating an example of a hardware configuration of the spoofing detection device according to the first example embodiment of the present invention.

FIG. 2 illustrates an example of a hardware configuration of the spoofing detection device 1. In FIG. 2, the spoofing detection device 1 can be configured with a computer device. The computer device includes a central processing unit (CPU) 1001, a random access memory (RAM) 1002, a read only memory (ROM) 1003, a storage device 1004, an imaging device 1005, and a display device 1006. The ROM 1003 and the storage device 1004 store a computer program causing the computer device to operate as the spoofing detection device 1 according to the present example embodiment, and various types of data. The imaging device 1005 is a device such as a camera capturing an image of a subject and generating an image displaying the subject. The display device 1006 is a device displaying various types of information on a display screen. The CPU 1001 controls the respective units in the computer device by reading the computer program and the various types of data stored in the ROM 1003 and the storage device 1004 into the RAM 1002, and executing the program. In this case, the facial image sequence acquisition unit 11 is configured with the imaging device 1005, and the CPU 1001 reading the computer program and the various types of data stored in the ROM 1003 and the storage device 1004 into the RAM 1002, and executing the program. Further, the line-of-sight change detection unit 12 is configured with the CPU 1001 reading the computer program and the various types of data stored in the ROM 1003 and the storage device 1004 into the RAM 1002, and executing the program. Further, the presentation information display unit 13 is configured with the display device 1006, and the CPU 1001 reading the computer program and the various types of data stored in the ROM 1003 and the storage device 1004 into the RAM 1002, and executing the program. The spoofing determination unit 14 is configured with the display device 1006, and the CPU 1001 reading the computer program and the various types of data stored in the ROM 1003 and the storage device 1004 into the RAM 1002, and executing the program. The hardware configurations of the spoofing detection device 1 and the respective functional blocks thereof are not limited to the configuration described above.

The facial image sequence acquisition unit 11 acquires a facial image sequence as input. The facial image sequence is a time series of a plurality of facial images indicating a user's face. The facial image sequence acquisition unit 11 may acquire the facial image sequence through the imaging device 1005. Further, the facial image sequence acquisition unit 11 may acquire, as the facial image sequence, a facial image sequence in which a region indicating a face is previously extracted. Alternatively, the facial image sequence acquisition unit 11 may extract respective facial regions from a time series of a plurality of images captured by the imaging device 1005, and generate the facial image sequence.

The line-of-sight change detection unit 12 detects information about temporal line-of-sight change from a facial image sequence. Specifically, the line-of-sight change detection unit 12 detects information indicating a line-of-sight from each facial image constituting the facial image sequence. Then, the line-of-sight change detection unit 12 may assume a time series of information indicating a line-of-sight or a time derivative value thereof as the information about temporal line-of-sight change. Further, the line-of-sight change detection unit 12 may use both of a time series of information indicating a line-of-sight and a derivative value thereof as the information about temporal line-of-sight change.

For example, the line-of-sight change detection unit 12 may employ information indicating a line-of-sight direction as the information indicating a line-of-sight. The information indicating a line-of-sight direction may be information indicating a direction of a line-of-sight on the basis of an optical axis of a camera, or information indicating a direction in a global coordinate system. Alternatively, the line-of-sight change detection unit 12 may employ information indicating a line-of-sight position as the information indicating a line-of-sight. For example, the information indicating a line-of-sight position may be position coordinates of a point closely watched by a user, in a display screen in the display device 1006.

The line-of-sight change detection unit 12 may employ a known line-of-sight detection technology for processing of detecting information indicating a line-of-sight from a facial image. When the employed line-of-sight detection technology assumes a gray-scale image composed of brightness value information as a facial image being a detection target, the aforementioned facial image sequence acquisition unit 11 acquires a gray-scale facial image sequence. Even in this case, an externally input image string is not necessarily gray-scale. For example, an image string input from the imaging device 1005 may be composed of RGB images composed of color components of R (red), G (green), and B (blue). In this case, the facial image sequence acquisition unit 11 or the line-of-sight change detection unit 12 may perform processing of generating a gray-scale image string from the input RGB image string. Without being limited to the above, the facial image sequence acquisition unit 11 or the line-of-sight change detection unit 12 may acquire or generate a facial image sequence in a form related to an employed line-of-sight detection technology.

The presentation information display unit 13 displays presentation information on the display device 1006. The presentation information refers to information presented to a user as part of authentication processing. Further, the part of authentication processing refers to presentation information being presented to a user in a flow of authentication processing performed in an unillustrated face authentication system in which the spoofing detection device 1 is used. Such presentation information is information presented as part of authentication processing even when spoofing detection is not performed in such a face authentication system. In other words, it is desirable that such presentation information be not information separately prepared for spoofing detection. For example, such presentation information may include textual information simply indicating a procedure such as "AUTHENTICATION STARTS," "PLEASE FACE FORWARD," and "PLEASE ENTER PASSCODE NUMBER." In addition, the presentation information may include a diagram.

The presentation information is not limited to textual information and a diagram, and may include another type of information, as long as the information is presented to a user as part of authentication processing.

Specifically, the presentation information display unit 13 displays presentation information at any timing and at any display position. The presentation information display unit 13 may predetermine a display timing and a display position of the presentation information. Alternatively, the presentation information display unit 13 may randomly determine a display timing and a display position for each processing operation performing spoofing determination.

The spoofing determination unit 14 determines a likelihood that a face indicated by a facial image sequence is spoofing, in accordance with information about temporal line-of-sight change with respect to presentation information. A line-of-sight of a user changes in accordance with presentation information. For example, the line-of-sight of the user is considered to change in accordance with a display timing, a display position, a presentation content, or the like of the presentation information. Further, for example, the line-of-sight of the user is also considered to change in accordance with a change in a display position of the presentation information, a change in a presentation content, or the like. Accordingly, the information about temporal line-of-sight change is related to the presentation information. Accordingly, the spoofing determination unit 14 may determine a likelihood of spoofing in accordance with relevance of the information about temporal line-of-sight change detected along with the presentation of the presentation information to the presentation information.

Further, the spoofing determination unit 14 outputs a determination result of spoofing. For example, when determining that spoofing exists, the spoofing determination unit 14 may output the determination result to the display device 1006 and another output device (unillustrated).

Figure 3:
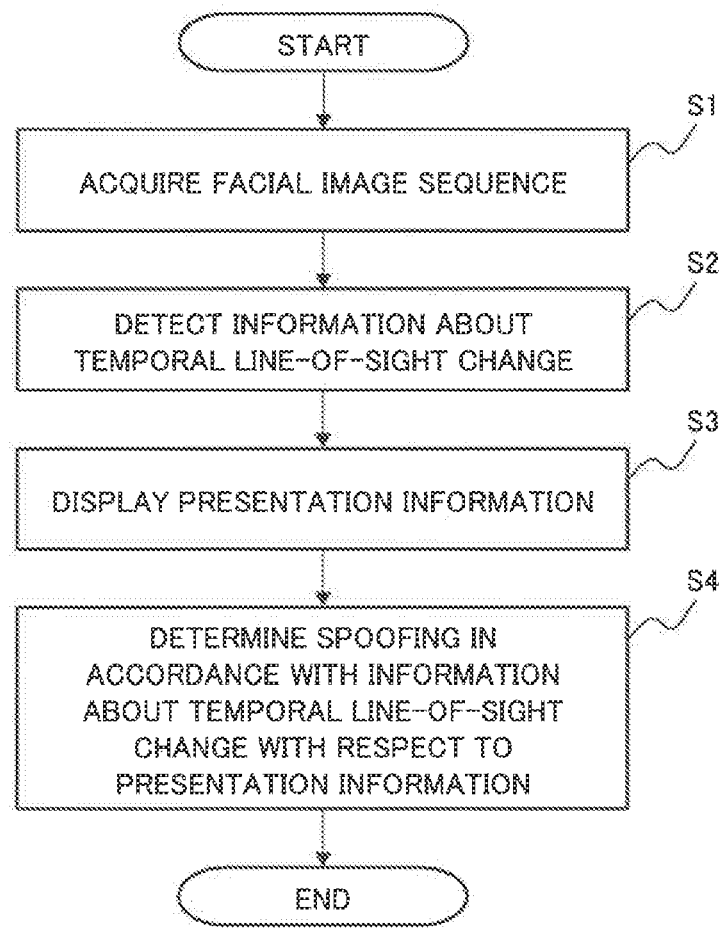
FIG. 3 is a flowchart illustrating an operation of the spoofing detection device according to the first example embodiment of the present invention.

An operation of the spoofing detection device 1 as configured above will be described with reference to FIG. 3.

First, the facial image sequence acquisition unit 11 starts acquisition of a facial image sequence (Step S1).

For example, the facial image sequence acquisition unit 11 acquires a facial image sequence by successively acquiring frames constituting a video image input from the imaging device 1005 while extracting a region indicating a face from each frame.

Next, the line-of-sight change detection unit 12 starts detection of information about temporal line-of-sight change from the facial image sequence (Step S2).

As described above, the line-of-sight change detection unit 12 detects information indicating a line-of-sight from each facial image in the facial image sequence successively acquired by the facial image sequence acquisition unit 11. Then, the line-of-sight change detection unit 12 detects a time series and a derivative value of the information as information about line-of-sight change.

Next, the presentation information display unit 13 displays, on the display device 1006, presentation information presented to a user as part of authentication processing (Step S3).

Next, the spoofing determination unit 14 determines a likelihood that a person indicated by the facial image sequence is spoofing, in accordance with relevance of the information about temporal line-of-sight change detected by the line-of-sight change detection unit 12 to the presentation information displayed by the presentation information display unit 13 (Step S4).

For example, the line-of-sight change detection unit 12 may determine whether or not spoofing exists, in accordance with whether or not the information about temporal line-of-sight change relates to a presentation timing, a display position, or a content of the presentation information, or changes thereof.

The above concludes the operation of the spoofing detection device 1.

Next, an effect of the first example embodiment of the present invention will be described.

The spoofing detection device according to the first example embodiment of the present invention is able to more accurately detect spoofing in face authentication, without increasing a scale of a device configuration and a burden on a user.

The reason is that the facial image sequence acquisition unit acquires a facial image sequence indicating a user's face, and the line-of-sight change detection unit detects information about temporal line-of-sight change from the facial image sequence. Further, the presentation information display unit displays presentation information presented to the user as part of authentication processing. Then, the spoofing determination unit determines a likelihood that the face included in the facial image sequence is spoofing, in accordance with the information about temporal line-of-sight change with respect to the presentation information.

A line-of-sight of a real person not being spoofing changes in accordance with presentation information. For example, a line-of-sight of a real person changes at a timing when presentation information is displayed on the display device and in a direction of a display position in the display device. However, when an impersonator displays a video image of a face of another person different from himself or herself on a display of a smartphone or the like, and presents the image to the imaging device, a line-of-sight of the another person in the display changes independently of the presentation information. For example, a line-of-sight of the another person in the display changes independently of a presentation timing and a display position of the presentation information.

Specifically, when a line-of-sight of the another person in the display is fixed, the line-of-sight does not change in conjunction with a display timing of the presentation information. Further, when a line-of-sight of the another person's face in the display moves in various directions, the line-of-sight is highly likely to change in a period in which the presentation information is not presented or at a timing different from a presentation timing. Further, in this case, the line-of-sight is highly likely to point in a direction different from a direction of a display position at a presentation timing. Consequently, when a video image of another person's face is displayed on a display of a smartphone or the like and the image is presented to a camera, information about temporal line-of-sight change detected by the line-of-sight change detection unit does not change in accordance with presentation information. Accordingly, the present example embodiment is able to accurately determine a likelihood of spoofing in accordance with relevance of information about temporal line-of-sight change to presentation information.

At this time, the present example embodiment uses information about temporal change obtained from a natural movement of a line-of-sight of a user to presentation information presented as part of authentication processing. Accordingly, the user is not required to perform an extra action or a line-of-sight movement, being instructed for spoofing determination. Further, the present example embodiment does not require a device, a distance sensor, or the like for acquiring images from a plurality of lines of sight for determination of three-dimensionality of a subject of imaging. The present example embodiment may acquire a facial image sequence of a user by at least one imaging device. Accordingly, the present example embodiment does not increase a scale of a device configuration.

Second Example Embodiment

Next, a second example embodiment of the present invention will be described in detail with reference to drawings. In the respective drawings referred to in the description of the present example embodiment, a same component as and a step operating similarly to the first example embodiment of the present invention are respectively given same reference signs as the first example embodiment, and detailed description thereof is omitted in the present example embodiment.

Figure 4:
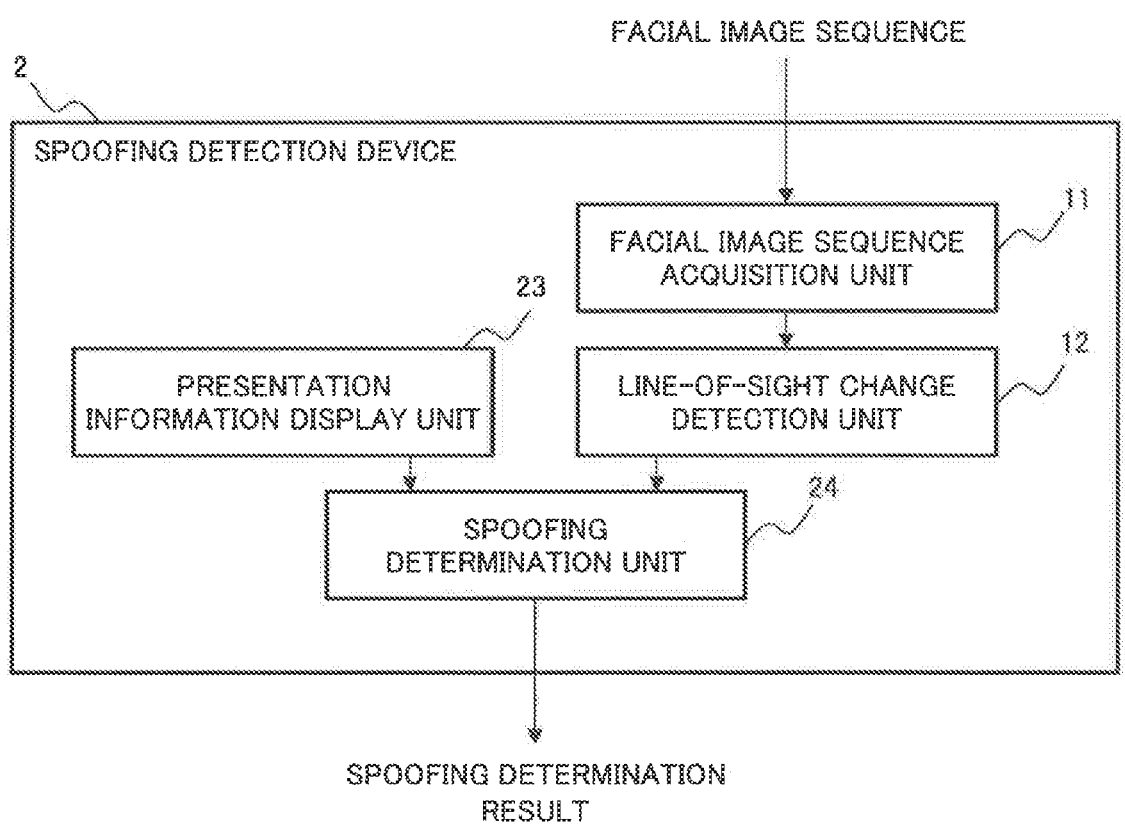
FIG. 4 is a functional block diagram of a spoofing detection device according to a second example embodiment of the present invention.

First, FIG. 4 illustrates a configuration of a spoofing detection device 2 according to the second example embodiment of the present invention. In FIG. 4, the spoofing detection device 2 differs from the spoofing detection device 1 according to the first example embodiment of the present invention in that a presentation information display unit 23 is included in place of the presentation information display unit 13. The spoofing detection device 2 also differs from the spoofing detection device 1 in that a spoofing determination unit 24 is included in place of the spoofing determination unit 14. In FIG. 4, a direction of an arrow connecting rectangles representing functional blocks indicates an example, and does not limit a signal direction between functional blocks.

The presentation information display unit 23 switches presentation information presented to a user as part of authentication processing. For example, the presentation information display unit 23 may switch a display position of presentation information. It is assumed that the switching of a display position refers to changing a display position in a display screen in a display device 1006. Further, for example, the presentation information display unit 23 may switch presentation information to another piece of presentation information. It is assumed that the switching to another piece of presentation information refers to changing presentation information displayed on the display device 1006 to another piece of presentation information. Further, when switching presentation information to another piece of presentation information, the presentation information display unit 23 may switch a display position thereof. While the presentation information display unit 23 performs such switching at least once, the switching frequency is not limited. Further, the presentation information display unit 23 may perform the switching of presentation information as described above at any timing.

Specifically, for example, the presentation information display unit 23 displays first presentation information at a timing of a time $m_{t1}$ at a display position $(m_{x1}, m_{y1})$. Then, the presentation information display unit 23 switches the first presentation information to second presentation information at a timing of a time $m_{t2}$. At this time, the presentation information display unit 23 displays the second presentation information at a display position $(m_{x2}, m_{y2})$. In this case, the presentation information display unit 23 may predetermine or randomly determine $m_{t1}$, $m_{t2}$, $(m_{x1}, m_{y1})$, and $(m_{x2}, m_{y2})$.

The spoofing determination unit 24 determines a likelihood of spoofing in accordance with relevance of information about temporal line-of-sight change detected by the line-of-sight change detection unit 12 to switching of presentation information. Specifically, the spoofing determination unit 24 may determine whether or not spoofing exists, by comparing the information about temporal line-of-sight change detected from a facial image sequence with a switching timing of the presentation information and a change in a display position due to the switching. For example, the spoofing determination unit 24 may determine whether or not a face indicated by the facial image sequence is spoofing, in accordance with whether or not the information about temporal line-of-sight change relates to the aforementioned switching timing $m_{t2}$. Further, the spoofing determination unit 24 may perform spoofing determination in accordance with whether or not the information about temporal line-of-sight change relates to a change in the display position by the switching from $(m_{x1}, m_{y1})$ to $(m_{x2}, m_{y2})$.

Figure 5:
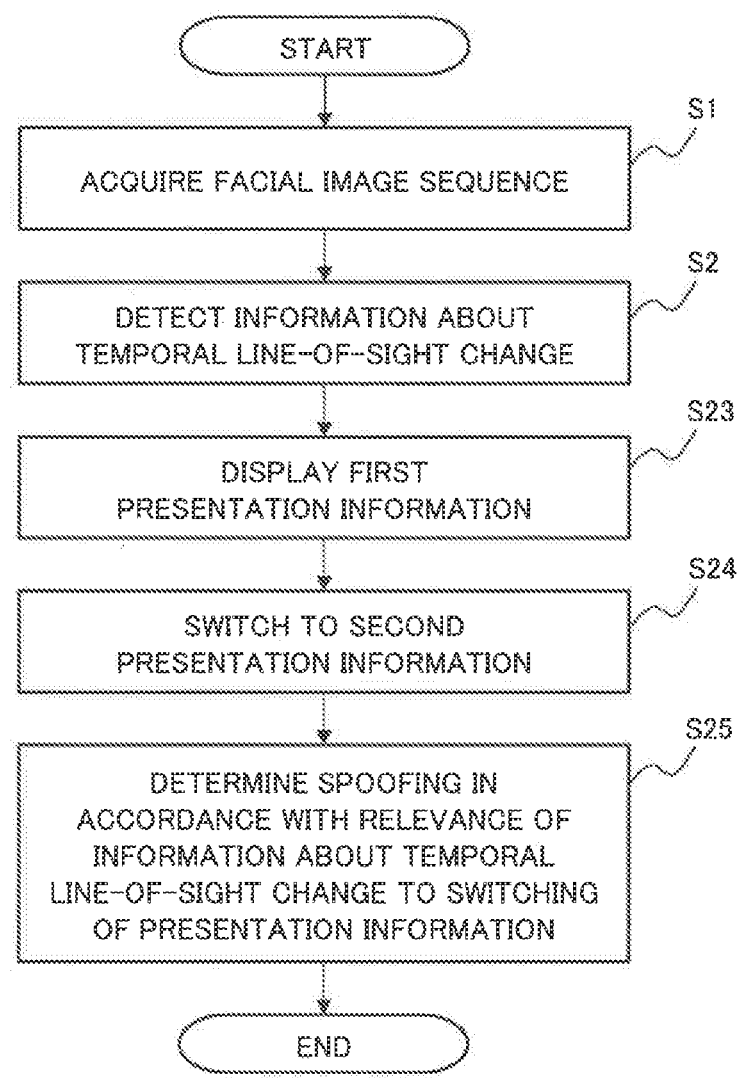
FIG. 5 is a flowchart illustrating an operation of the spoofing detection device according to the second example embodiment of the present invention.

An operation of the spoofing detection device 2 as configured above will be described with reference to FIG. 5.

First, similarly to the first example embodiment of the present invention, the spoofing detection device 2 performs Steps S1 to S2. Thus, the spoofing detection device 2 starts acquisition of a facial image sequence and starts detection of information about temporal line-of-sight change.

Next, the presentation information display unit 23 displays, on the display device 1006, first presentation information presented to a user as part of authentication processing (Step S23).

Next, the presentation information display unit 23 switches the first presentation information to second presentation information (Step S24).

Next, the spoofing determination unit 24 determines a likelihood of spoofing with respect to a person indicated by the facial image sequence, in accordance with relevance of the information about temporal line-of-sight change detected by the line-of-sight change detection unit 12 to the switching of the presentation information by the presentation information display unit 23 (Step S25).

For example, as described above, the line-of-sight change detection unit 12 may determine whether or not spoofing exists, in accordance with whether or not the information about temporal line-of-sight change relates to a switching timing of the presentation information and a change in a display position accompanying the switching.

The above concludes the operation of the spoofing detection device 2.

Next, the operation according to the second example embodiment of the present invention will be described by use of a specific example.

First, the facial image sequence acquisition unit 11 starts acquisition of a facial image sequence (Step S1).

Figure 6:
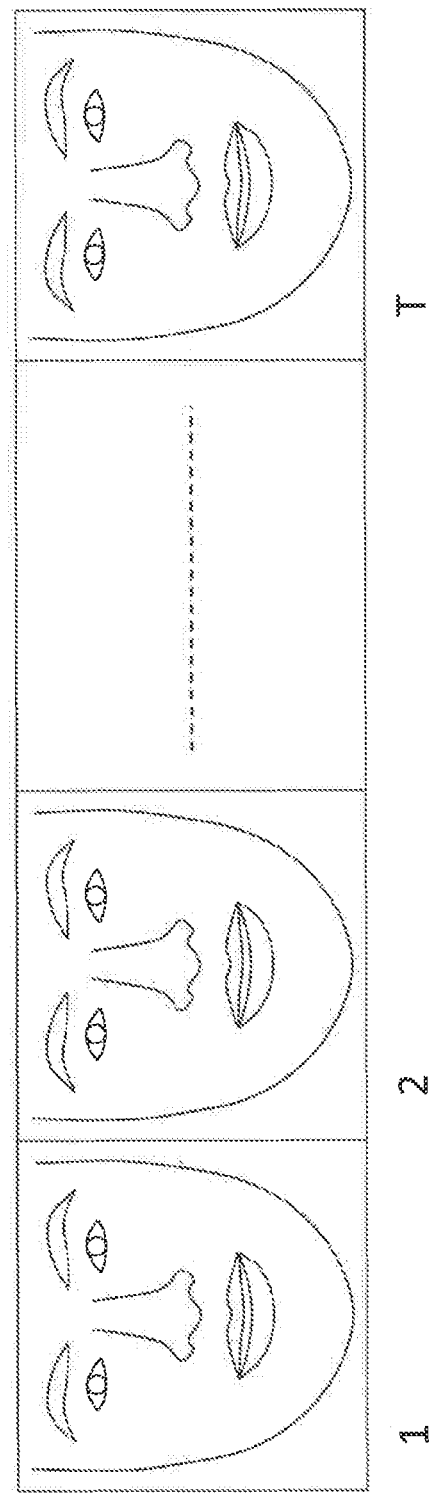
FIG. 6 is a diagram illustrating an example of a facial image sequence according to the second example embodiment of the present invention.

It is assumed that the facial image sequence acquired by the facial image sequence acquisition unit 11 is a string of facial images obtained by extracting face regions from respective gray-scale images captured at certain intervals. For example, the facial image sequence acquisition unit 11 may obtain a face position by use of a known face detection technology from time-series gray-scale images output from an imaging device 1005 such as a video camera. Then, the facial image sequence acquisition unit 11 may extract face regions from the respective images as a facial image sequence, in accordance with the obtained face position. Alternatively, the facial image sequence acquisition unit 11 may acquire a facial image sequence obtained by previously extracting face regions by an external device from an image string output from the imaging device 1005. FIG. 6 illustrates an example of a facial image sequence in this specific example. The facial image sequence illustrated in FIG. 6 is acquired over a period from a time 1 to a time T.

The line-of-sight change detection unit 12 detects information about temporal line-of-sight change from the facial image sequence in FIG. 6 (Step S2).

The line-of-sight change detection unit 12 detects information about a line-of-sight by use of a known line-of-sight detection technology from the respective facial images in the facial image sequence. For example, when a known technology of detecting a line-of-sight direction is employed, the line-of-sight change detection unit 12 may detect a line-of-sight direction from a facial image at a time t in the facial image sequence. Then, the x component of the direction may be denoted as gx(t) and the y component thereof as gy(t). Further, for example, when a known technology of detecting a line-of-sight position is employed, the line-of-sight change detection unit 12 may detect a line-of-sight position from a facial image at a time t in the facial image sequence. Then, the x coordinate of the position may be denoted as gx(t) and the y coordinate thereof as gy(t). In this specific example, it is assumed that information indicating a line-of-sight position is employed.

Then, the line-of-sight change detection unit 12 uses time series of gx(t) and gy(t) for T facial images from the start (t=1) to the end (t=T) of the facial image sequence as information about temporal line-of-sight change. Further, the line-of-sight change detection unit 12 uses values [Gx(t), Gy(t)] obtained by differentiating [gx(t), gy(t)] (t=1 to T) with respect to time t as the information about temporal line-of-sight change. In other words, in this specific example, the information about temporal line-of-sight change is composed of four values with respect to time $t_c$ a line-of-sight position [gx(t), gy(t)] and derivative values thereof [Gx(t), Gy(t)].

Figure 7:
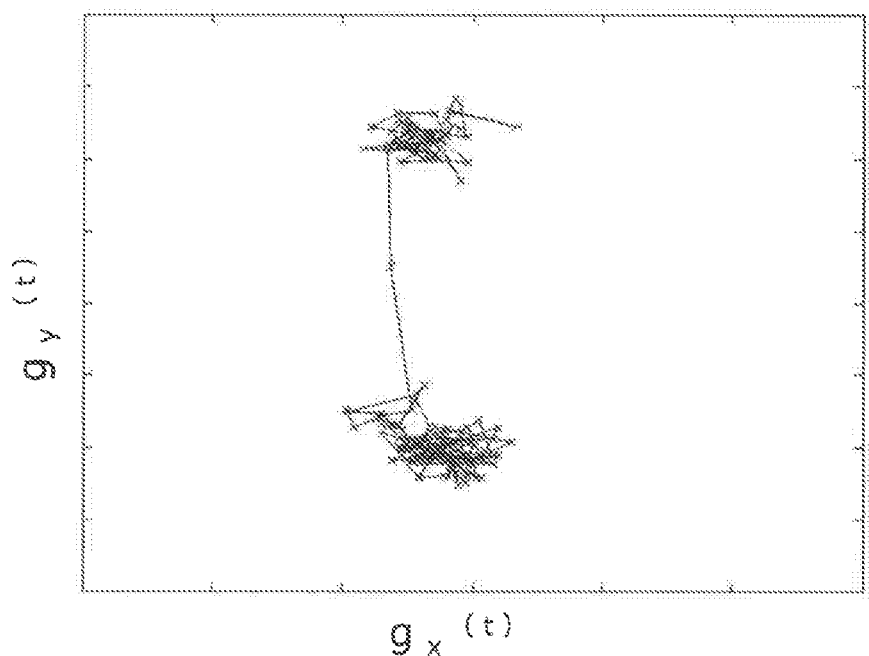
FIG. 7 is a diagram illustrating an example of detected change in a line-of-sight position, according to the second example embodiment of the present invention.
Figure 8:
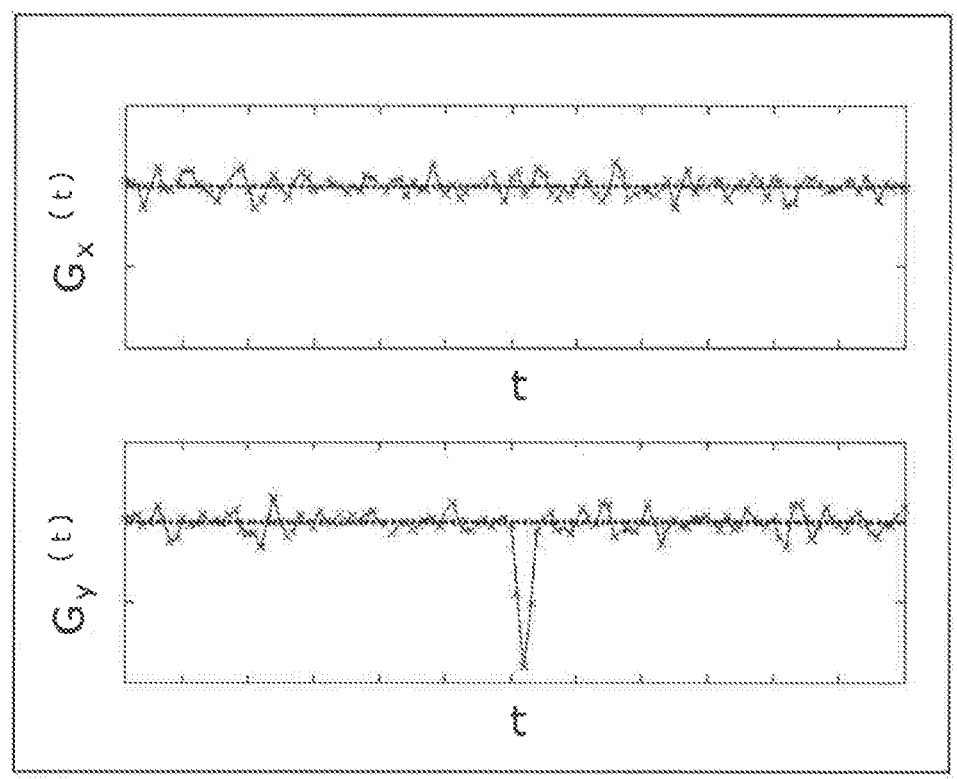
FIG. 8 is a diagram illustrating an example of a detected derivative value of a line-of-sight position, according to the second example embodiment of the present invention.
Figure 9:
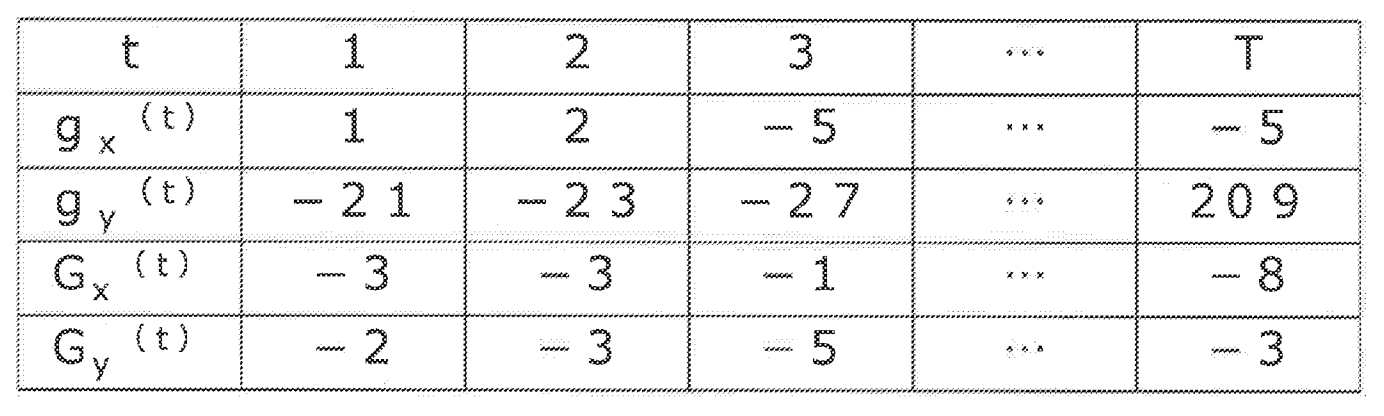

For example, it is assumed that information illustrated in FIGS. 7 to 9 is detected as information about temporal line-of-sight change. FIG. 7 illustrates a line-of-sight position [gx(t), gy(t)] detected from the respective facial images in the facial image sequence. FIG. 8 illustrates values [Gx(t), Gy(t)] obtained by differentiating the line-of-sight position [gx(t), gy(t)] in FIG. 7 with respect to time t. FIG. 9 indicates the line-of-sight position [gx(t), gy(t)] at each time t and the derivative values [Gx(t), Gy(t)] thereof. As illustrated in FIGS. 7 to 9, the line-of-sight position detected from the facial image sequence and the derivative values thereof change temporally.

Figure 10:
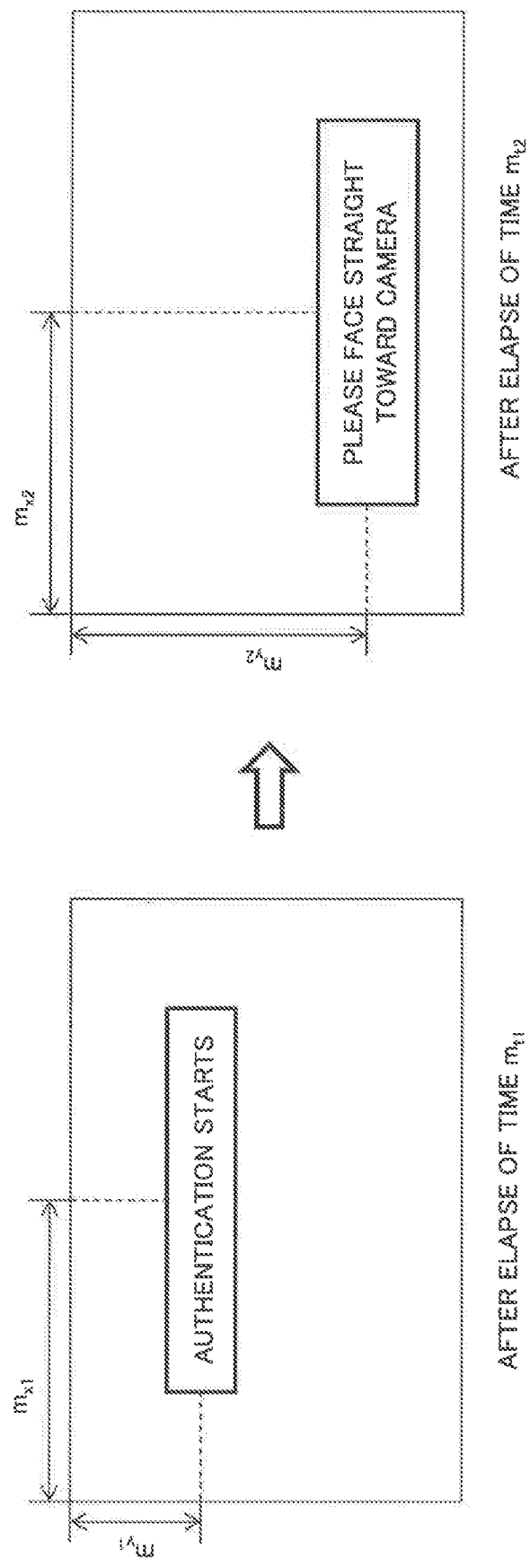
FIG. 10 is a diagram illustrating an example of switching of presentation information according to the second example embodiment of the present invention.

Next, the presentation information display unit 23 displays first presentation information at a timing of a time $m_{t1}$ at a display position $(m_{x1}, m_{y1})$ (Step S23). FIG. 10 illustrates a display example of the first presentation information. In a diagram on the left in FIG. 10, the first presentation information is textual information "AUTHENTICATION STARTS." In this step, it is assumed that the presentation information display unit 23 randomly selects the first presentation timing $m_{t1}$ and the display position $(m_{x1}, m_{y1})$.

Next, the presentation information display unit 23 switches the first presentation information to second presentation information at a timing of a time $m_{t2}$ and displays the second presentation information at a display position $(m_{x2}, m_{y2})$ (Step S24). It is assumed that $m_{t2} > m_{t1}$. FIG. 10 illustrates a display example of the second presentation information. In a diagram on the right in FIG. 10, the second presentation information is textual information "PLEASE FACE STRAIGHT TOWARD CAMERA." In this step, it is assumed that the presentation information display unit 23 randomly selects the second presentation timing $m_{t2}$ and the display position $(m_{x2}, m_{y2})$.

While two pieces of presentation information are switched and displayed in this specific example, a case that three or more pieces of presentation information are successively switched and displayed is also applicable.

Next, the spoofing determination unit 24 performs spoofing determination in accordance with relevance of the information about temporal line-of-sight change detected by the line-of-sight change detection unit 12 to the switching of the presentation information by the presentation information display unit 23 (Step S25).

The spoofing determination unit 24 performs spoofing determination by use of equations (1) to (3) below. As described above, a line-of-sight position is denoted as [gx(t), gy(t)], and derivative values thereof are denoted as [Gx(t), Gy(t)], as detected information about temporal line-of-sight change. Further, it is assumed that a time at which the first presentation information is displayed is denoted as $m_{t1}$ and a presentation position thereof as $(m_{x1}, m_{y1})$. It is also assumed that a time at which the second presentation information is displayed is denoted as $m_{t2}$ and a presentation position thereof as $(m_{x2}, m_{y2})$.

First, the spoofing determination unit 24 calculates a time τ at which a change in the line-of-sight is greatest around the switching time $m_{t2}$ of the presentation information as expressed in equation (1) below.

$$\tau = \underset{m_{t2}-t_a \le t \le m_{t2}+t_b}{\mathrm{argmax}} \left( \left| G_x^{(t)} \right| + \lambda_1 \left| G_y^{(t)} \right| \right) \tag{1}$$

$G_x^{(t)}$ and $G_y^{(t)}$ are the aforementioned derivative values Gx(t) and Gy(t), respectively. Further, $t_a$, $t_b$, and $\lambda_1$ are parameters. Note that $\lambda_1$ is a parameter for adjusting a balance between a change component in an x direction and a change component in a y direction. Further, $t_a$ and $t_b$ are parameters for determining an interval in which τ is obtained.

Next, the spoofing determination unit 24 obtains $\varepsilon_1$ being difference between magnitude of a change in the line-of-sight position, and magnitude of a change in the display position between the two pieces of presentation information, on the basis of the time τ at which a change in the line-of-sight is greatest, by use of equation (2) below. Further, $\varepsilon_1$ is hereinafter referred to as an evaluation value 1.

$$\varepsilon_1 = \mathrm{abs}(\|(G_x^{(t)}, G_y^{(t)})^T\| - \lambda_2 \|((m_{x2}, m_{y2})^T - (m_{x1}, m_{y1}))\|) \tag{2}$$

Note that $\lambda_2$ is a parameter for adjusting a balance between magnitude of a change in the line-of-sight position, and magnitude of a change in the display position between the two pieces of presentation information. Further, abs in equation (2) is a function for calculating an absolute value.

Further, the spoofing determination unit 24 obtains $\varepsilon_2$ being difference between a direction of a change in the line-of-sight position, and a direction of a change in the display position between the two pieces of presentation information, by use of equation (3) below. Further, $\varepsilon_2$ is hereinafter referred to as an evaluation value 2.

$$\varepsilon_2 = a\cos\left( \frac{(G_x^{(\tau)}, G_y^{(\tau)})((m_{x2}, m_{y2})^T - (m_{x1}, m_{y1})^T)}{\|(G_x^{(\tau)}, G_y^{(\tau)})^T\| \|((m_{x2}, m_{y2})^T - (m_{x1}, m_{y1})^T)\|} \right) \tag{3}$$

Then, the spoofing determination unit 24 compares the evaluation value 1 with a threshold value 1 and compares the evaluation value 2 with a threshold value 2. Then, the spoofing determination unit 24 determines whether or not the face included in the acquired facial image sequence is spoofing, in accordance with the comparison results.

In the specific example described above, the values of the evaluation values 1 and 2 respectively become smaller as the facial image sequence acquired by the facial image sequence acquisition unit 11 is more likely to indicate a real person's face. Further, the values of the evaluation values 1 and 2 are respectively designed to become larger as the facial image sequence is more likely to indicate an impersonated face. The impersonated face refers to a face or the like included in a video image presented on a display of a smartphone or the like. Then, when both of the evaluation values 1 and 2 are respectively greater than the threshold values, the spoofing determination unit 24 determines that the face is spoofing. Further, when at least either one of the evaluation values 1 and 2 is less than the threshold value, the spoofing determination unit 24 determines that the face is a person's face (not spoofing). The spoofing determination unit 24 may determine that the face is spoofing when at least either one of the evaluation values 1 and 2 is greater than the threshold value.

Further, the threshold value 1 and the threshold value 2 may be changed depending on a purpose. For example, for a purpose in which failing to catch an impersonating person is fatal, it is desirable that the values of the threshold value 1 and the threshold value 2 be set on the low side. By contrast, for a purpose in which a real person being mistakenly determined as spoofing is a problem, it is desirable that the values of the threshold value 1 and the threshold value 2 be set on the high side.

Next, an effect of the second example embodiment of the present invention will be described.

The spoofing detection device according to the second example embodiment of the present invention is able to more accurately detect spoofing in face authentication, without increasing a scale of a device configuration and a burden on a user.

The reason is that, in addition to a configuration similar to the first example embodiment of the present invention, the presentation information display unit switches and displays presentation information presented to a user as part of authentication processing. Then, the spoofing determination unit determines whether or not a face included in a facial image sequence is spoofing, in accordance with information about temporal line-of-sight change with respect to the switching of the presentation information.

A line-of-sight of a real person is considered to change along with switching of presentation information in face authentication. However, when an impersonator displays a video image of another person's face different from himself or herself on a display of a smartphone or the like and presents the image to the imaging device, a line-of-sight of the another person's face in the display changes independently of the switching of the presentation information. Specifically, for example, when a line-of-sight of the another person in the display is fixed, the line-of-sight does not change at a switching timing of the presentation information. Further, when a line-of-sight of the another person in the display moves in a various manner, the line-of-sight is highly likely to change in a period other than a switching timing of the presentation information. Further, in this case, even when a display position changes along with switching of the presentation information, the line-of-sight is highly likely to change in a direction of a position other than a display position after the change. Accordingly, when a video image of another person's face is displayed on a display of a smartphone or the like and the image is presented to a camera, relevance of information about temporal line-of-sight change detected by the line-of-sight change detection unit to switching of presentation information is low.

Accordingly, the present example embodiment is able to accurately determine spoofing in accordance with relevance of information about temporal line-of-sight change to switching of presentation information. Further, at this time, the present example embodiment uses information about temporal line-of-sight change with respect to switching of presentation information presented as part of authentication processing. In general, presentation information presented as part of authentication processing often includes a plurality of types. Accordingly, by utilizing information about temporal line-of-sight change with respect to switching of such a plurality of pieces of presentation information, the present example embodiment is able to apply a more natural line-of-sight movement of a user in authentication processing to spoofing determination. Consequently, the present example embodiment reduces a burden on the user.

An example of the presentation information display unit according to the present example embodiment switching presentation information to another piece of presentation information has been mainly described. In addition, the presentation information display unit may perform switching of displaying same presentation information at another display position at any timing.

Third Example Embodiment

Next, a third example embodiment of the present invention will be described in detail with reference to drawings. In the respective drawings referred to in the description of the present example embodiment, a same component as and a step operating similarly to the first example embodiment of the present invention are respectively given same reference signs as the first example embodiment, and detailed description thereof is omitted in the present example embodiment.

Figure 11:
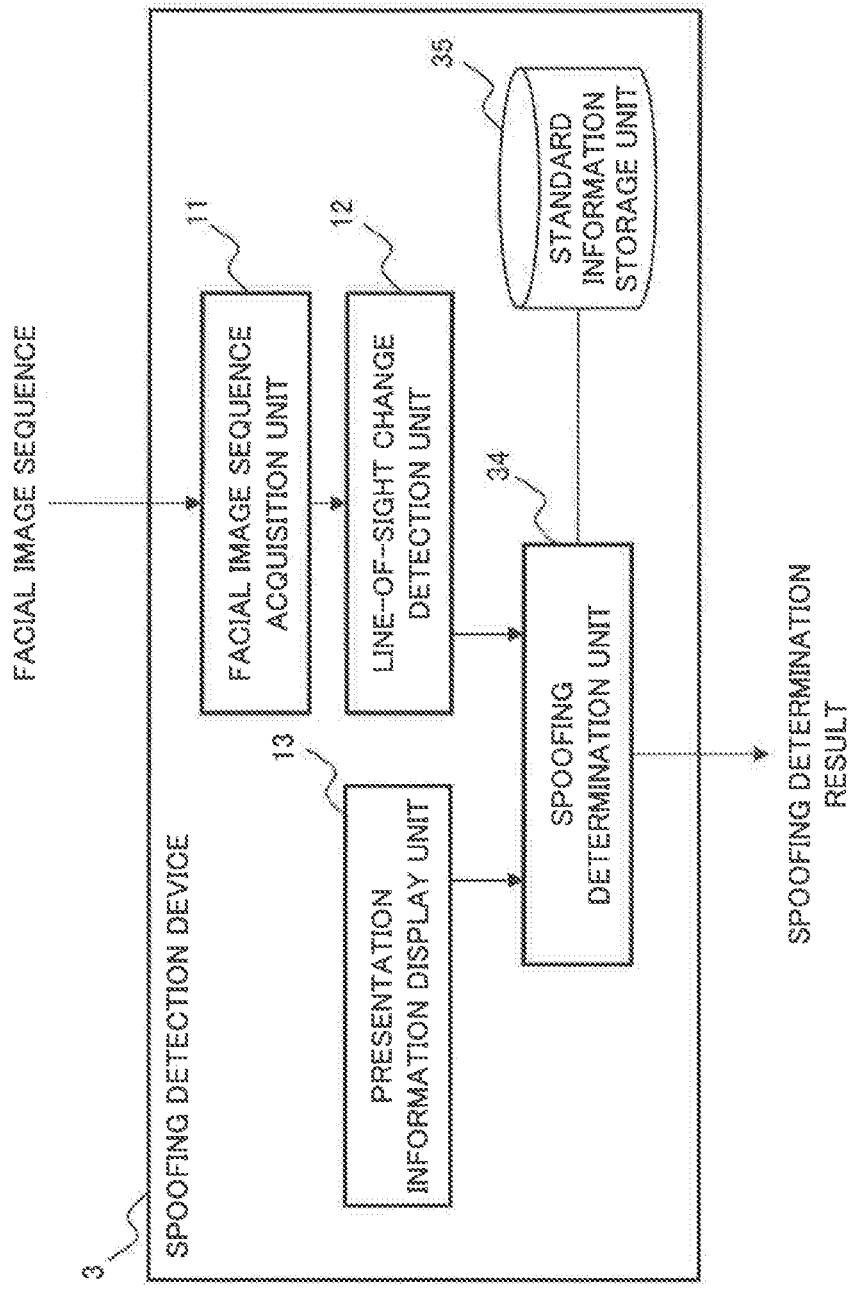
FIG. 11 is a functional block diagram of a spoofing detection device according to a third example embodiment of the present invention.

First, FIG. 11 illustrates a configuration of a spoofing detection device 3 according to the third example embodiment of the present invention. In FIG. 11, the spoofing detection device 3 differs from the spoofing detection device 1 according to the first example embodiment of the present invention in that a spoofing determination unit 34 is included in place of the spoofing determination unit 14. The spoofing detection device 3 also differs from the spoofing detection device 1 in that a standard information storage unit 35 is further included. The standard information storage unit 35 constitutes an example embodiment of part of the spoofing determination unit according to the present invention. Further, in FIG. 11, a direction of an arrow connecting rectangles representing functional blocks indicates an example, and does not limit a signal direction between functional blocks.

The standard information storage unit 35 stores standard information about temporal line-of-sight change related to a content of presentation information. In general, a user is considered to unconsciously or habitually move a line-of-sight in accordance with a content of presentation information. The standard information about temporal line-of-sight change indicates temporal change in the line-of-sight that the person unconsciously or habitually moves when the presentation information is displayed.

For example, with respect to presentation information composed of a character string "PLEASE ENTER PASSCODE NUMBER" and a passcode number entry screen, a user is considered to move a line-of-sight little by little near the passcode number entry screen in order to enter a passcode number. Further, for example, with respect to presentation information being a character string "PLEASE FACE STRAIGHT TOWARD CAMERA," a user is considered to fix a line-of-sight in a direction of a camera for a certain time, in order to stare in the direction of the camera. Further, for example, with respect to presentation information indicating a long sentence, a user is considered to move a line-of-sight so as to sequentially read words in the sentence, in order to read and interpret the sentence. Thus, the standard information storage unit 35 stores generally assumed information about temporal line-of-sight change, being associated with a content of the presentation information.

The spoofing determination unit 34 compares information about temporal line-of-sight change detected by the line-of-sight change detection unit 12 with information about line-of-sight change stored in the standard information storage unit 35, being associated with a content of presentation information displayed at the time. Then, when determining, in accordance with the comparison result, that the detected information about temporal line-of-sight change does not agree with the standard information about temporal line-of-sight change related to the content of the presentation information, the spoofing determination unit 34 determines that spoofing exists. Further, when determining, in accordance with the comparison result, that the two agree with one another, the spoofing determination 34 determines that spoofing does not exist.

Figure 12:
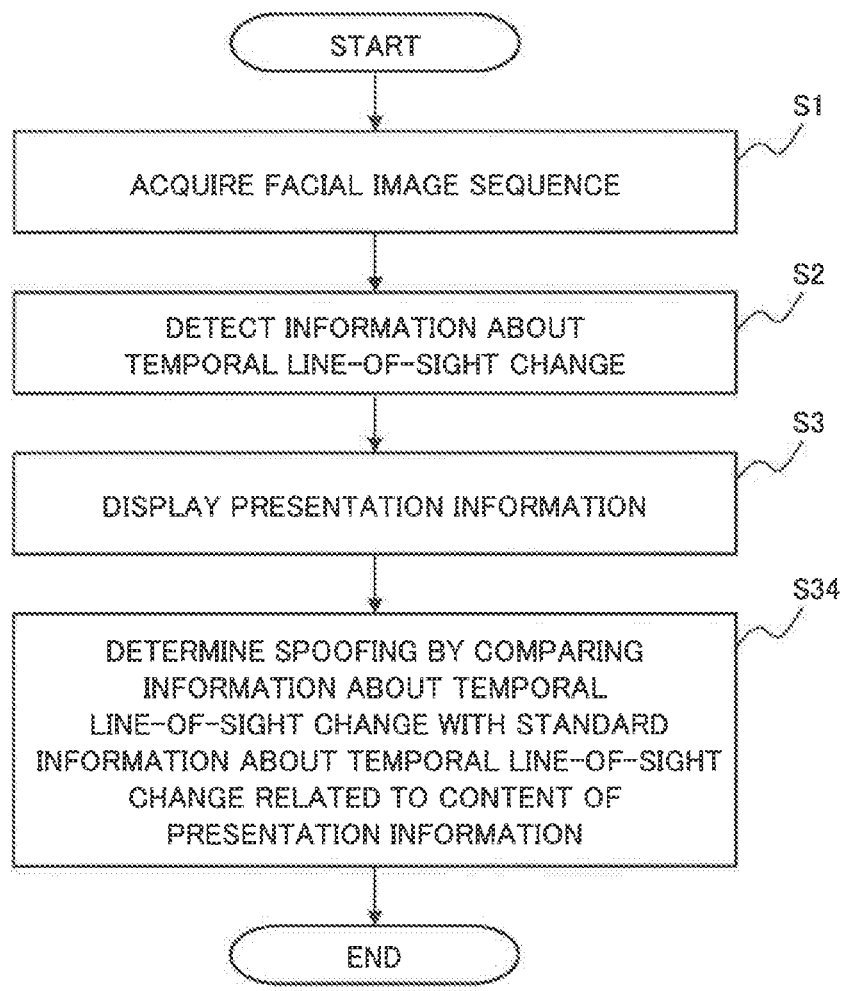
FIG. 12 is a flowchart illustrating an operation of the spoofing detection device according to the third example embodiment of the present invention.

An operation of the spoofing detection device 3 as configured above will be described with reference to FIG. 12.

First, similarly to the first example embodiment of the present invention, the spoofing detection device 3 performs Steps S1 to S3. Thus, the spoofing detection device 3 starts acquisition of a facial image sequence and detection of information about temporal line-of-sight change, and displays presentation information.

Next, the spoofing determination unit 34 compares the information about temporal line-of-sight change detected by the line-of-sight change detection unit 12 with standard information about temporal line-of-sight change related to a content of the presentation information presented by the presentation information display unit 13. Then, in accordance with the comparison result, the spoofing determination unit 34 determines a likelihood of spoofing with respect to a person indicated by the facial image sequence (Step S34).

The above concludes the operation of the spoofing detection device 3.

Next, the operation according to the third example embodiment of the present invention will be described by use of a specific example.

In this specific example, the standard information storage unit 35 prestores standard information about temporal line-of-sight change, being associated with a content of assumed presentation information. For example, the standard information storage unit 35 stores information about temporal change in a line-of-sight moving little by little near a passcode number entry screen, being associated with presentation information composed of textual information "PLEASE ENTER PASSCODE NUMBER." Further, for example, the standard information storage unit 35 stores information about temporal change in a line-of-sight staring in a direction of a camera for a certain time, being associated with presentation information composed of textual information "PLEASE FACE STRAIGHT TOWARD CAMERA." Further, for example, the standard information storage unit 35 stores information about temporal change in a line-of-sight sequentially moving through each word in a sentence in a position of presentation information, being associated with the presentation information composed of a long sentence. It is assumed that, similarly to detected information about temporal line-of-sight change, standard information about temporal line-of-sight change is composed of a time series of a line-of-sight position and derivative values thereof.

In this specific example, the spoofing detection device 3 operates similarly to the specific example according to the second example embodiment of the present invention up to Steps S1 and S2. Accordingly, it is assumed that the spoofing detection device 3 acquires a facial image sequence as illustrated in FIG. 6 and detects information about temporal line-of-sight change as illustrated in FIGS. 7 to 9.

Next, the presentation information display unit 13 displays presentation information on a display device 1006 (Step S3).

Next, the spoofing determination unit 34 compares the information about temporal line-of-sight change detected in Step S2 with standard information about temporal line-of-sight change related to the presentation information displayed in Step S3. Then, in accordance with the comparison result, the spoofing determination unit 34 determines a likelihood of spoofing with respect to a person indicated by the facial image sequence (Step S34).

Specifically, the spoofing determination unit 34 calculates difference $\varepsilon_3$ between a variance of the detected information about temporal line-of-sight change [gx(t), gy(t)] and a variance of the standard information about temporal line-of-sight change [hx(t), hy(t)] by use of equation (4) below. Further, $\varepsilon_3$ is hereinafter referred to as an evaluation value 3.

$$\varepsilon_3 = \left| \underset{m_t-t_c \leq t \leq m_t+t_d}{\text{var}} \left(g_x^{(t)}\right) - \underset{m_t-t_c \leq t \leq m_t+t_d}{\text{var}} \left(h_x^{(t)}\right) \right| + \lambda_3 \left| \underset{m_t-t_c \leq t \leq m_t+t_d}{\text{var}} \left(g_y^{(t)}\right) - \underset{m_t-t_c \leq t \leq m_t+t_d}{\text{var}} \left(h_y^{(t)}\right) \right| \quad (4)$$

Note that $g_x^{(t)}$, $g_y^{(t)}$, $h_x^{(t)}$, and $h_y^{(t)}$ are the aforementioned information about temporal change gx(t), gy(t), hx(t), and hy(t), respectively. Further, var is a function for calculating a variance. Further, $\lambda_3$ is a parameter for adjusting a balance between an x component and a y component. Further, $m_t$ denotes a time at which the presentation information is displayed by the presentation information display unit 13. Further, $t_c$ and $t_d$ are parameters for determining an interval in which a variance is calculated. Each of the values of $t_c$ and $t_d$ may be set to a positive value, a negative value, or zero. For example, when both values of $t_c$ and $t_d$ are set to positive values, equation (4) above calculates the evaluation value 3 with respect to a predetermined interval including the time $m_t$. Further, when $t_c$ is set to zero and $t_d$ is set to a positive value, equation (4) above calculates the evaluation value 3 with respect to a predetermined interval at and after the time $m_t$. Further, when $t_c$ is set to a negative value and $t_d$ is set to a positive value, equation (4) above calculates variances with respect to a predetermined interval at or after the time $m_t$ considering a human reaction rate.

The spoofing determination unit 34 compares the evaluation value 3 with a threshold value 3. Then, when the evaluation value 3 is greater than the threshold value 3, the spoofing determination unit 34 determines that a face indicated by the facial image sequence is spoofing. Further, when the evaluation value 3 is less than the threshold value 3, the spoofing determination unit 34 determines that the face indicated by the facial image sequence is not spoofing.

Further, the present example embodiment may be implemented in combination with the second example embodiment of the present invention. In that case, the spoofing detection device 3 includes the presentation information display unit 23 according to the second example embodiment of the present invention in place of the presentation information display unit 13. Then, similarly to the spoofing determination unit 24 according to the second example embodiment of the present invention, the spoofing determination unit 34 may calculate the evaluation values 1 and 2 in the specific example described above. Additionally, the spoofing determination unit 34 may calculate the evaluation value 3 in the specific example described above. In this case, the spoofing determination unit 34 may calculate the evaluation value 3 by comparing detected information about temporal line-of-sight change with standard information about temporal line-of-sight change with respect to presentation information before and after switching, respectively. Then, in accordance with the comparison result between the evaluation value 1, the evaluation value 2, and the evaluation value 3, and the respective threshold values, the spoofing determination unit 34 may perform spoofing determination. For example, the spoofing determination unit 34 may determine that the face is spoofing when all of the evaluation value 1, the evaluation value 2, and the evaluation value 3 are greater than the respective threshold values.

Next, an effect of the third example embodiment of the present invention will be described.

The spoofing detection device according to the third example embodiment of the present invention is able to more accurately detect spoofing in face authentication, without increasing a scale of a device configuration and a burden on a user.

The reason is that, in addition to a configuration similar to the first example embodiment of the present invention, the spoofing determination unit determines a likelihood of spoofing with respect to a face indicated by a facial image sequence, in accordance with relevance of detected information about temporal line-of-sight change to a content of presentation information.

In face authentication, a line-of-sight of a real person is considered to change unconsciously in accordance with a content of presentation information. However, when an impersonator displays a video image of another person's face different from himself or herself on a display of a smartphone or the like and presents the image to an imaging device, a line-of-sight of the another person's face in the display is highly likely to exhibit a movement not assumed from the content of the presentation information. Specifically, for example, in a case that a line-of-sight of the another person in the display is fixed, even when the content of the presentation information is a content prompting entry of a passcode number, the line-of-sight of the another person in the display does not change. Further, in a case that a line-of-sight of the another person in the display moves in a various manner, even when the content of the presentation information is, for example, a sentence, a change in the line-of-sight of the another person in the display is highly likely to be different from a movement of a line-of-sight reading words in the sentence. Accordingly, when a video image of another person's face is displayed on a display of a smartphone or the like and the image is presented to a camera, information about temporal line-of-sight change detected by the line-of-sight change detection unit does not agree with standard information about temporal line-of-sight change related to a content of presentation information.

Thus, the present example embodiment is able to determine spoofing by use of a natural movement of a line-of-sight of a user, the movement being related to a content of presentation information presented to the user as part of authentication processing. Consequently, the present example embodiment is able to accurately detect spoofing, without increasing a burden on the user for spoofing detection.

The facial image sequence acquisition unit according to the respective aforementioned example embodiments of the present invention has been described on the assumption that a facial image sequence based on images input from the imaging device is acquired nearly in real time. In addition, the facial image sequence acquisition unit may acquire a facial image sequence stored in a storage device (e.g. video data captured and saved by an imaging device in the past). In this case, the spoofing determination unit may acquire information about a presentation timing and a presentation position of presentation information displayed by the presentation information display unit at the time of capturing the facial image sequence. For example, information about such presentation information may be stored in the storage device along with the facial image sequence. Then, the spoofing determination unit may compare information indicating temporal line-of-sight change detected from the facial image sequence acquired from the storage device with information about the presentation information.

Further, a case of using a time series of information indicating a line-of-sight position or a line-of-sight direction, and derivative values thereof as information about temporal line-of-sight change according to the respective aforementioned example embodiments of the present invention has been mainly described. In addition, the information about temporal line-of-sight change may be another type of information as long as the information can be detected from a facial image sequence and can indicate temporal change in a line-of-sight.

Further, an example of the spoofing determination unit according to the aforementioned second and third example embodiments of the present invention determining spoofing by use of the evaluation values 1 to 3 has been mainly described. At this time, equations for respectively calculating the evaluation values 1 to 3 are not limited to the above. Further, without being limited to the evaluation values, the spoofing determination unit may determine spoofing in accordance with relevance of detected information about temporal line-of-sight change to presentation information presented to a user as part of authentication processing.

Further, an example of the spoofing determination unit according to the respective aforementioned example embodiments of the present invention determining whether or not a face indicated by a facial image sequence is spoofing has been mainly described. In addition, the spoofing determination unit may output information indicating a degree of spoofing as a determination result.

Further, an example of each functional block in the spoofing detection device according to the respective aforementioned example embodiments of the present invention being provided by a CPU executing a computer program stored in the storage device or a ROM has been mainly described. In addition, the respective functional blocks may be provided, in part, in whole, or in combination, by dedicated hardware.

Further, the functional blocks of the spoofing detection device according to the respective aforementioned example embodiments of the present invention may be provided by a plurality of devices in a distributed manner.

Further, the operations of the spoofing detection device according to the respective aforementioned example embodiments of the present invention described with reference to the flowcharts may be stored in the storage device (recording medium) in a computer device as a computer program according to the present invention. Then, the CPU may read out and execute such a computer program. Then, in such a case, the present invention is composed of a code of such a computer program or a recording medium.

Further, the respective aforementioned example embodiments may be implemented in combination as appropriate.

Further, without being limited to the respective aforementioned example embodiments, the present invention may be implemented in various embodiments.

INDUSTRIAL APPLICABILITY

The spoofing detection technology according to the present invention is able to more accurately detect spoofing in face authentication, without increasing a scale of a device configuration and a burden on a user. The technology is widely applicable to a purpose of improving a security level of a system using face authentication.

The present invention has been described with the aforementioned example embodiments as exemplary examples. However, the present invention is not limited to the aforementioned example embodiments. In other words, various embodiments that can be understood by a person skilled in the art may be applied to the present invention, within the scope thereof.

This application claims priority based on Japanese Patent Application No. 2014-210529 filed on Oct. 15, 2014, the disclosure of which is hereby incorporated by reference thereto in its entirety.

REFERENCE SIGNS LIST 1, 2, 3 Spoofing detection device
11 Facial image sequence acquisition unit
12 Line of sight change detection unit
13, 23 Presentation information display unit
14, 24, 34 Spoofing determination unit
35 Standard information storage unit
1001 CPU
1002 RAM
1003 ROM
1004 Storage device
1005 Imaging device
1006 Display device

What is claimed is:

1. A face detection device comprising:
at least one memory configured to store instructions; and
at least one processor configured to execute the instructions to perform:
acquiring a facial image indicating a face of a user;
displaying presentation information on a screen on a display device and changing a position of the presentation information on the screen of the display device;
detecting information indicating a line-of-sight of the user based on a time changing the position of the presentation information; and
determining whether the face of the user indicated by the facial image is a living face, based on a relationship between the information indicating the line-of-sight of the user and the position of the presentation information on the screen of the display device.

2. The face detection device according to claim 1,
wherein the information indicating the line-of-sight of the user is detected from the facial image corresponding to a time the position of the presentation information was changed.

3. The face detection device according to claim 1, wherein
the position of the presentation information is changed multiple times on the screen of the display device,
the information indicating the line-of-sight of the user is detected each time the position of the presentation information is changed, and
whether the face of the user indicated by the facial image is the living face is detected based on the relationship between the information indicating the line-of-sight of the user and the position of the presentation information on the screen of the display device for each time the position of the position of the presentation information was changed and the information indicating the light-of-sight detected.

4. The face detection device according to claim 3, wherein
the face of the user indicated by the facial image is determined as the living face, in a case where the relationship between the information indicating the line-of-sight of the user and the position of the presentation information on the screen of the display device does not indicate impersonation at least one of the multiple times the position of the position of the presentation information was changed and the information indicating the light-of-sight detected.

5. The face detection device according to claim 1, wherein only moving presentation information is di splayed on the display device.

6. The face detection device according to claim 1, wherein
the information indicating the line-of-sight of the user is detected based on the time changing the position of the presentation information in that the information is detected once the position of the presentation information has been changed.

7. A face detection method performed by a computer and comprising:
acquiring a facial image indicating a user's face;
acquiring a facial image indicating a face of a user;
displaying presentation information on a screen on a display device and changing a position of the presentation information on the screen of the display device;
detecting information indicating a line-of-sight of the user based on a time changing the position of the presentation information; and
determining whether the face of the user indicated by the facial image is a living face, based on a relationship between the information indicating the line-of-sight of the user and the position of the presentation information on the screen of the display device.

8. The face detection method according to claim 7,
wherein detecting the information indicating the line-of-sight of the user is detected from the facial image corresponding to a time the position of the presentation information was.

9. The face detection method according to claim 7, wherein
the position of the presentation information is changed multiple times on the screen of the display device,
the information indicating the line-of-sight of the user is detected each time the position of the presentation information is changed, and
whether the face of the user indicated by the facial image is the living face is detected based on the relationship between the information indicating the line-of-sight of the user and the position of the presentation information on the screen of the display device for each time the position of the position of the presentation information was changed and the information indicating the light-of-sight detected.

10. The face detection method according to claim 9, wherein
the face of the user indicated by the facial image is determined as the living face, in a case where the relationship between the information indicating the line-of-sight of the user and the position of the presentation information on the screen of the display device does not indicate impersonation at least one of the multiple times the position of the position of the presentation information was changed and the information indicating the light-of-sight detected.

11. The face detection method according to claim 7, wherein
only moving presentation information is displayed on the display device.

12. The face detection method according to claim 7, wherein
the information indicating the line-of-sight of the user is detected based on the time changing the position of the presentation information in that the information is detected once the position of the presentation information has been changed.

13. A non-transitory program recording medium recording storing a program for causing a computer to execute processing of:
acquiring a facial image indicating a face of a user;
displaying presentation information on a screen on a display device and changing a position of the presentation information on the screen of the display device;
detecting information indicating a line-of-sight of the user based on a time changing the position of the presentation information; and
determining whether the face of the user indicated by the facial image is a living face, based on a relationship between the information indicating the line-of-sight of the user and the position of the presentation information on the screen of the display device.

14. The non-transitory program recording medium according to claim 13,
wherein the information indicating the line-of-sight of the user is detected from the facial image corresponding to a time the position of the presentation information was changed.

15. The non-transitory program recording medium according to claim 13, wherein
the position of the presentation information is changed multiple times on the screen of the display device,
the information indicating the line-of-sight of the user is detected the position of the presentation information is changed, and
whether the face of the user indicated by the facial image is the living face is detected based on the relationship between the information indicating the line-of-sight of the user and the position of the presentation information on the screen of the display device for each time the position of the position of the presentation information was changed and the information indicating the light-of-sight detected.

16. The non-transitory program recording medium according to claim 15, wherein
the face of the user indicated by the facial image is determined as the living face, in a case where the relationship between the information indicating the line-of-sight of the user and the position of the presentation information on the screen of the display device does not indicate impersonation at least one of the multiple times the position of the position of the presentation information was changed and the information indicating the light-of-sight detected.

17. The non-transitory program recording medium according to claim 13, wherein
only moving presentation information is di splayed on the display device.

18. The non-transitory program recording medium according to claim 13, wherein
the information indicating the line-of-sight of the user is detected based on the time changing the position of the presentation information in that the information is detected once the position of the presentation information has been changed.

* * * * *